United States Patent
Ham et al.

(10) Patent No.: US 10,613,658 B2
(45) Date of Patent: Apr. 7, 2020

(54) TOUCH DISPLAY DEVICE WITH REDUCED MATRIX SCATTERING

(71) Applicant: LG DISPLAY CO., LTD., Seoul (KR)

(72) Inventors: Jung-Hyun Ham, Paju-si (KR); Yoo-Jin Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 75 days.

(21) Appl. No.: 15/336,463

(22) Filed: Oct. 27, 2016

(65) Prior Publication Data

US 2017/0123544 A1    May 4, 2017

(30) Foreign Application Priority Data

Nov. 4, 2015    (KR) .................. 10-2015-0154323

(51) Int. Cl.
| | |
|---|---|
| G06F 3/044 | (2006.01) |
| G06F 3/041 | (2006.01) |
| G02F 1/1333 | (2006.01) |
| G02F 1/1343 | (2006.01) |

(52) U.S. Cl.
CPC ........ *G06F 3/0412* (2013.01); *G02F 1/13338* (2013.01); *G02F 1/134309* (2013.01); *G06F 3/044* (2013.01); *G02F 2001/134372* (2013.01)

(58) Field of Classification Search
CPC ........... G02F 1/13338; G02F 1/134309; G02F 2001/134372; G06F 3/0412; G06F 3/044
See application file for complete search history.

(56) References Cited

U.S. PATENT DOCUMENTS

| | | | | |
|---|---|---|---|---|
| 2010/0207857 | A1* | 8/2010 | Gu ................... | G02F 1/133512 345/88 |
| 2014/0362027 | A1* | 12/2014 | Hsu ........................ | G06F 3/044 345/174 |
| 2015/0097802 | A1* | 4/2015 | Kim ....................... | G06F 3/044 345/174 |

FOREIGN PATENT DOCUMENTS

| | | |
|---|---|---|
| CN | 102375273 A | 3/2012 |
| CN | 102478737 A | 5/2012 |
| CN | 102478738 A | 5/2012 |
| CN | 102945094 A | 2/2013 |
| CN | 102955635 A | 3/2013 |
| CN | 103207491 A | 7/2013 |

* cited by examiner

*Primary Examiner* — Ram A Mistry
(74) *Attorney, Agent, or Firm* — Dentons US LLP

(57) ABSTRACT

Disclosed is a touch display device capable of improving resolution and visibility. The touch display device is configured such that a display electrode in a display panel and a touch-sensing electrode located on a top of the display panel are inclined at the same angle in the same direction.

2 Claims, 5 Drawing Sheets

TOUCH DISPLAY DEVICE WITH REDUCED MATRIX SCATTERING

This application claims the benefit of Korean Patent Application No. 2015-0154323, filed on Nov. 4, 2015, which is hereby incorporated by reference as if fully set forth herein.

BACKGROUND OF THE INVENTION

Field of the Invention

The present invention relates to a touch display device which is capable of improving resolution and visibility.

Discussion of the Related Art

A touch panel is an input device that allows a user to input a command by selecting an instruction, displayed on the screen of a display device or the like, with the hand or an object. That is, the touch panel converts a contact position, which is contacted by the user's hand or an object, into an electrical signal, and receives an instruction, selected at the contact position, as an input signal. The touch panel may replace a separate input device that is operated in the state of being connected to a display device, such as a keyboard or a mouse, and thus the range of use thereof is gradually increasing.

The touch panel described above is attached to the front surface of a liquid crystal display. At this time, in the liquid crystal display, because display electrodes are regularly arranged in respective pixel areas, and thus serve as a diffraction grid, a plurality of diffracted images may be generated by the display electrodes depending on the wavelength of the light that is emitted from a backlight unit and passes through the display electrodes, which may cause constructive interference.

In addition, in the touch panel, because touch-sensing electrodes are also regularly arranged and serve as a diffraction grid, a plurality of diffracted images may be generated by the touch-sensing electrodes depending on the wavelength of the light that is directed from the display panel and passes through the touch-sensing electrodes, which may cause constructive interference.

At this time, because the touch-sensing electrodes and the display electrodes are designed without giving consideration to the arrangement relationship therebetween, the images diffracted by the touch-sensing electrodes differ from the images diffracted by the display electrodes. Therefore, as illustrated in FIG. 1, matrix scattering caused by the images diffracted by the display electrodes and matrix scattering caused by the images diffracted by the touch-sensing electrodes are strongly generated in different directions. Accordingly, visual deteriorations attributable to the reflection of ambient light (e.g. double images and color-shift) may occur, which causes deterioration in image visibility.

SUMMARY OF THE INVENTION

Accordingly, the present invention is directed to a touch display device that substantially obviates one or more problems due to limitations and disadvantages of the related art.

An object of the present invention is to provide a touch display device which is capable of improving resolution and visibility.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch display device is configured such that a display electrode in a display panel and a touch-sensing electrode located on a top of the display panel are inclined at the same angle in the same direction.

In a first embodiment of the touch display device according to the present invention, the display electrode includes a display slit that has a shape of "<" or ">", which is symmetrical about a center line of each pixel area, which is parallel to any one of a gate line and a data line, and the touch-sensing electrode includes a touch slit that has a shape of "<" or ">", which is inclined in the same direction as the display slit.

In a second embodiment of the touch display device according to the present invention, the display electrode includes a display slit that has a shape of "<" or ">", which is inclined in two directions so as to be symmetrical about a center line of each pixel area, which is parallel to any one of the gate line and the data line, and the touch-sensing electrode includes a touch slit that is inclined in the same direction as one of the two inclination directions of the display slit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments of the present invention will be described in detail with reference to the accompanying drawings.

Figure 1:
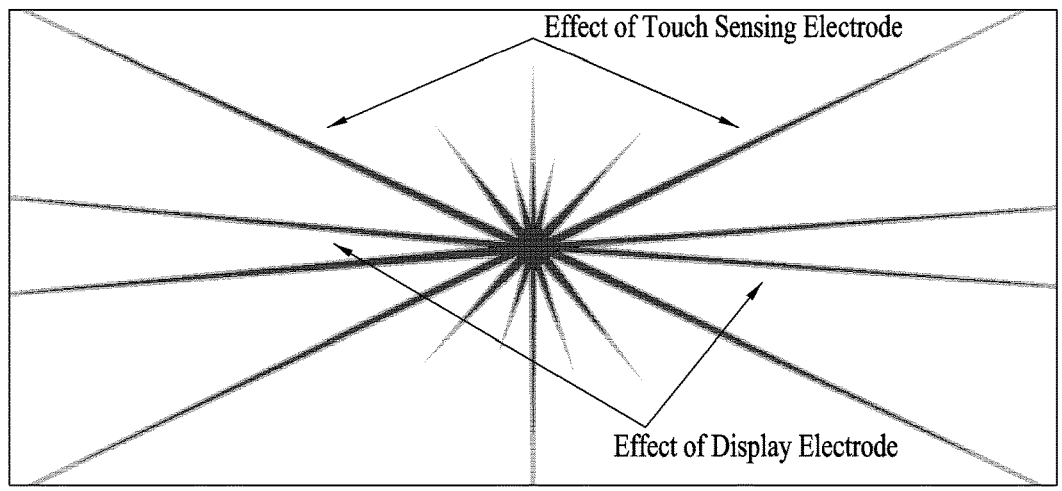
FIG. 1 is a schematic view explaining the deterioration in resolution due to conventional touch-sensing electrodes and display electrodes.
Figure 2:
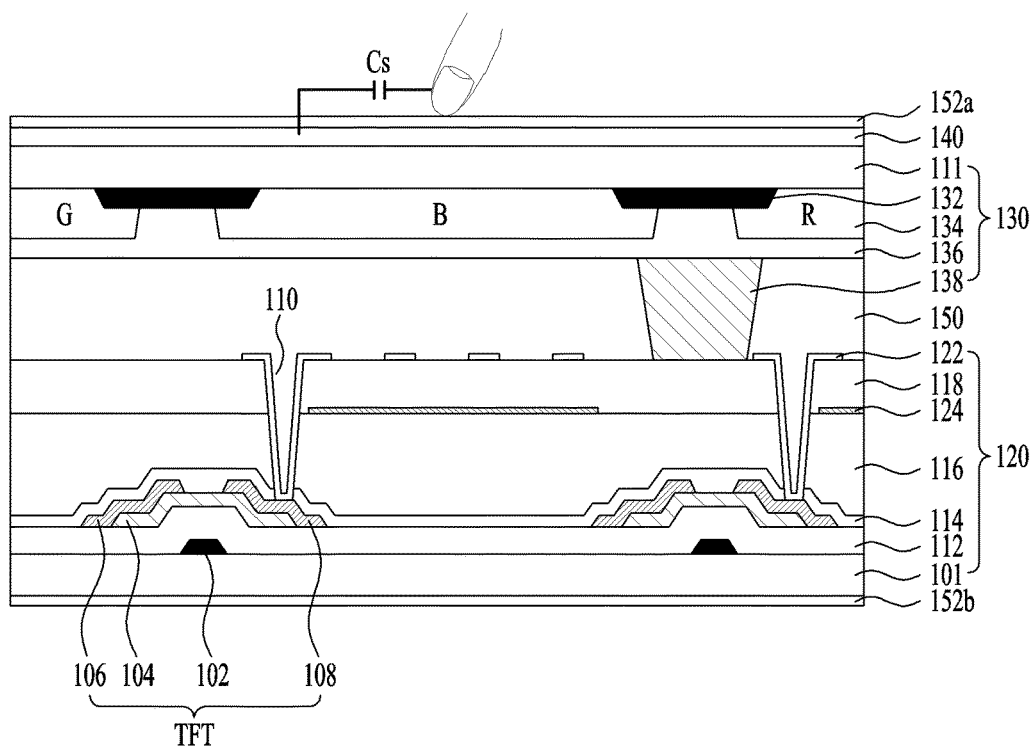
FIG. 2 is a sectional view illustrating a touch display device according to the present invention.

FIG. 2 is a sectional view illustrating a touch display device having a touch sensor according to the present invention.

The touch display device having a touch sensor illustrated in FIG. 2 includes a thin film transistor substrate 120, a color filter substrate 130, and a touch sensor 140.

The color filter substrate 130 includes a black matrix 132 for preventing the leakage of light, color filters 134 for the creation of colors, an overcoat layer 136 for planarization, and a column spacer 138 for maintaining a cell gap.

The black matrix 132 is formed on an upper substrate 111 so as to overlap at least one of gate lines, data lines, and thin film transistors. The black matrix 132 serves to divide the respective pixel areas from one another and to prevent light interference between the neighboring pixel areas.

The red (R), green (G) and blue (B) color filters 134 are formed on the upper substrate 111 so as to create corresponding colors.

The column spacer 138 is formed on the overcoat layer 136 so as to overlap the black matrix 132, thereby maintaining a cell gap between the color filter substrate 130 and the thin film transistor substrate 120.

Figure 3:
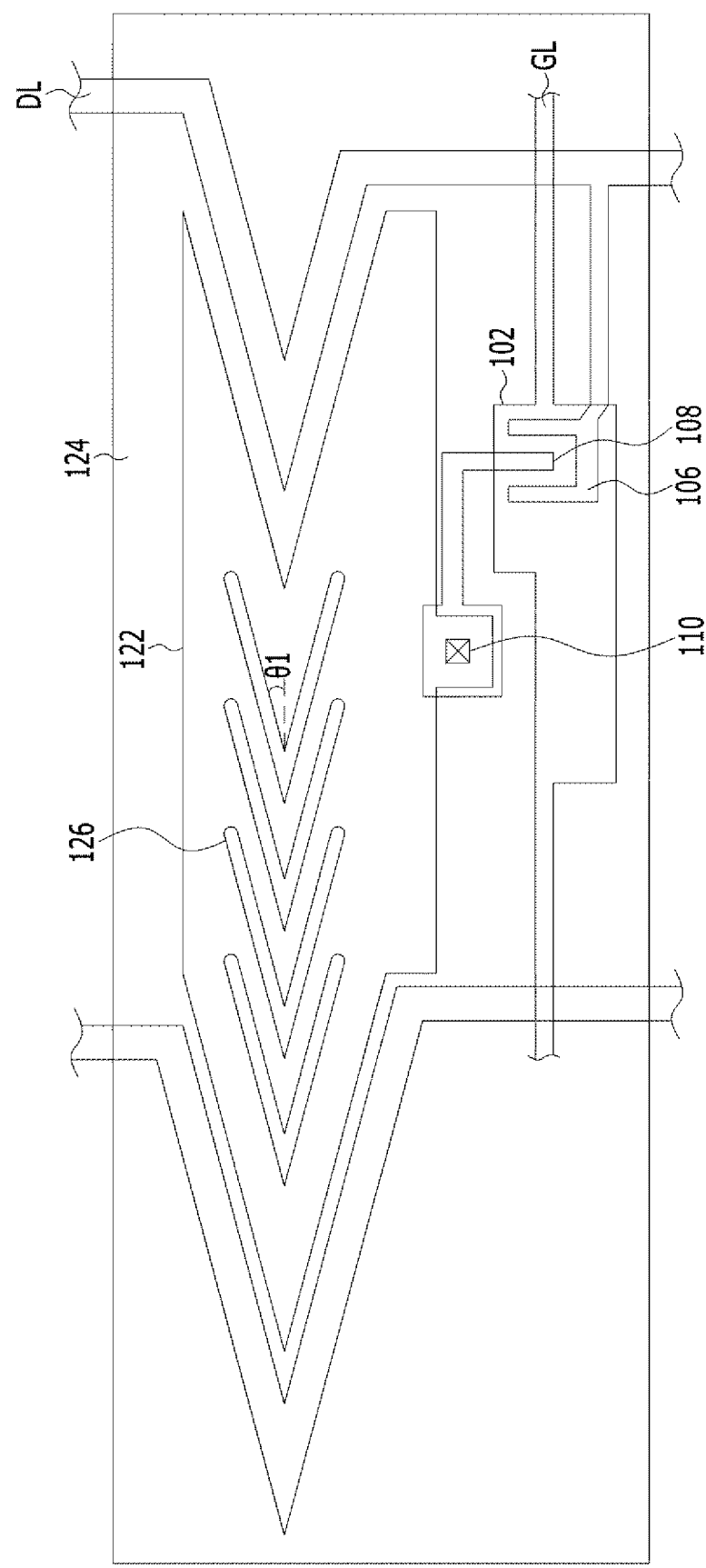
FIG. 3 is a plan view illustrating a thin film transistor substrate illustrated in FIG. 2.

As illustrated in FIGS. 2 and 3, the thin film transistor substrate 120 includes thin film transistors TFT connected to gate lines GL and data lines DL, a pixel electrode 122 connected to each of the thin film transistors TFT, and a common electrode 124 for forming an electric field along with the pixel electrode 122.

Each of the thin film transistors TFT selectively supplies a data signal from the data line DL to the pixel electrode 122 in response to a gate signal from the gate line GL. To this end, the thin film transistor TFT includes a gate electrode 102 connected to the gate line GL, a source electrode 106 connected to the data line DL, a drain electrode 108 connected to the pixel electrode 122, and a semiconductor layer 104 formed on a gate insulation film 112 so as to form a channel between the source electrode 106 and the drain electrode 108.

The common electrode 124 is formed on a second protective film 116 and forms a fringe field along with the pixel electrode 122.

The pixel electrode 122 is connected to the drain electrode 108 of the thin film transistor TFT, which is exposed through a contact hole 110 formed in first to third protective films 114, 116 and 118. When a video signal is supplied to the pixel electrode 122 through the thin film transistor TFT, the pixel electrode 122 forms a fringe field along with the common electrode 124, to which a common voltage is supplied, thereby causing liquid crystal molecules, which are horizontally arranged between the thin film transistor substrate 120 and the color filter substrate 130, to be rotated by dielectric anisotropy. In addition, the transmittance of light passing through the pixel areas varies depending on the degree of rotation of liquid crystal molecules, thereby realizing the gradation of light.

In addition, the pixel electrode 122 is formed on the third protective film 118 to have a plurality of display slits 126. Here, as illustrated in FIG. 3, each of the display slits 126 has a symmetrical shape and is obliquely inclined at a first angle θ1 within the range from zero to 10 degrees relative to the center line (imaginary line) of each pixel area, which is parallel to the gate line GL. The side surface of the pixel electrode 122, which is exposed through the display slit 126, has a symmetrical shape and is obliquely inclined at the first angle θ1 within the range from zero to 10 degrees relative to the center line of the pixel area. As such, the fringe field between the common electrode 124 and the pixel electrode 122 is formed in different directions in the upper section and the lower section of each pixel area, which enables the formation of multiple domains.

Although the pixel electrode 122 of the present invention has been described as having the display slits 126 by way of example, the common electrode 124 may have the display slits 126 and the pixel electrode 122 may have a plate shape so that the fringe field is formed between the pixel electrode 122 and the common electrode 124.

A lower polarizer 152b is formed on the back surface of a lower substrate 101 of the thin film transistor substrate, and an upper polarizer 152a is formed on the back surface of the upper substrate 111. The touch sensor 140 is formed between the upper polarizer 152a and the upper substrate 111.

Figure 4:
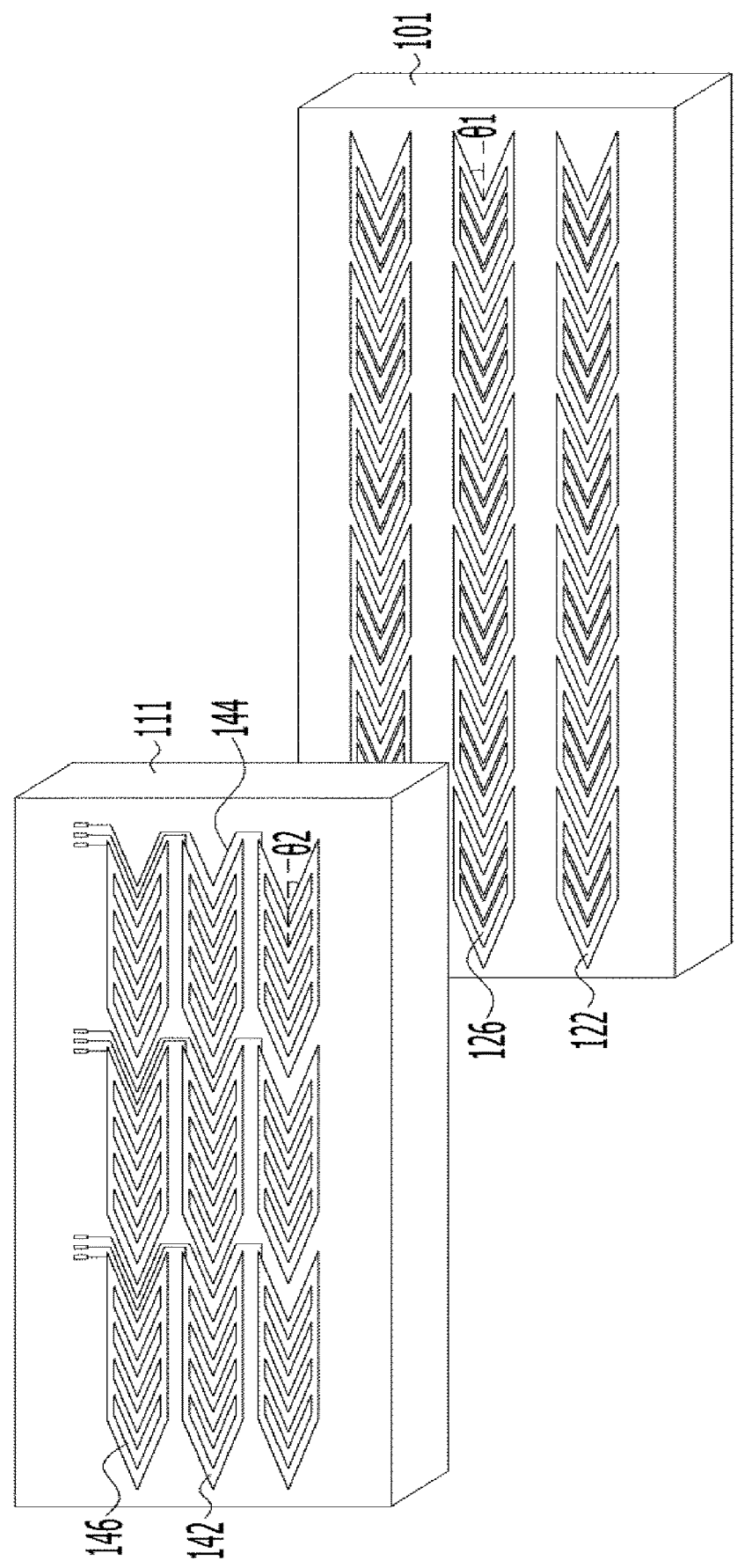
FIG. 4 is a schematic view illustrating a first embodiment related to the arrangement relationship between touch-sensing electrodes and display electrodes illustrated in FIG. 2.
Figure 5:
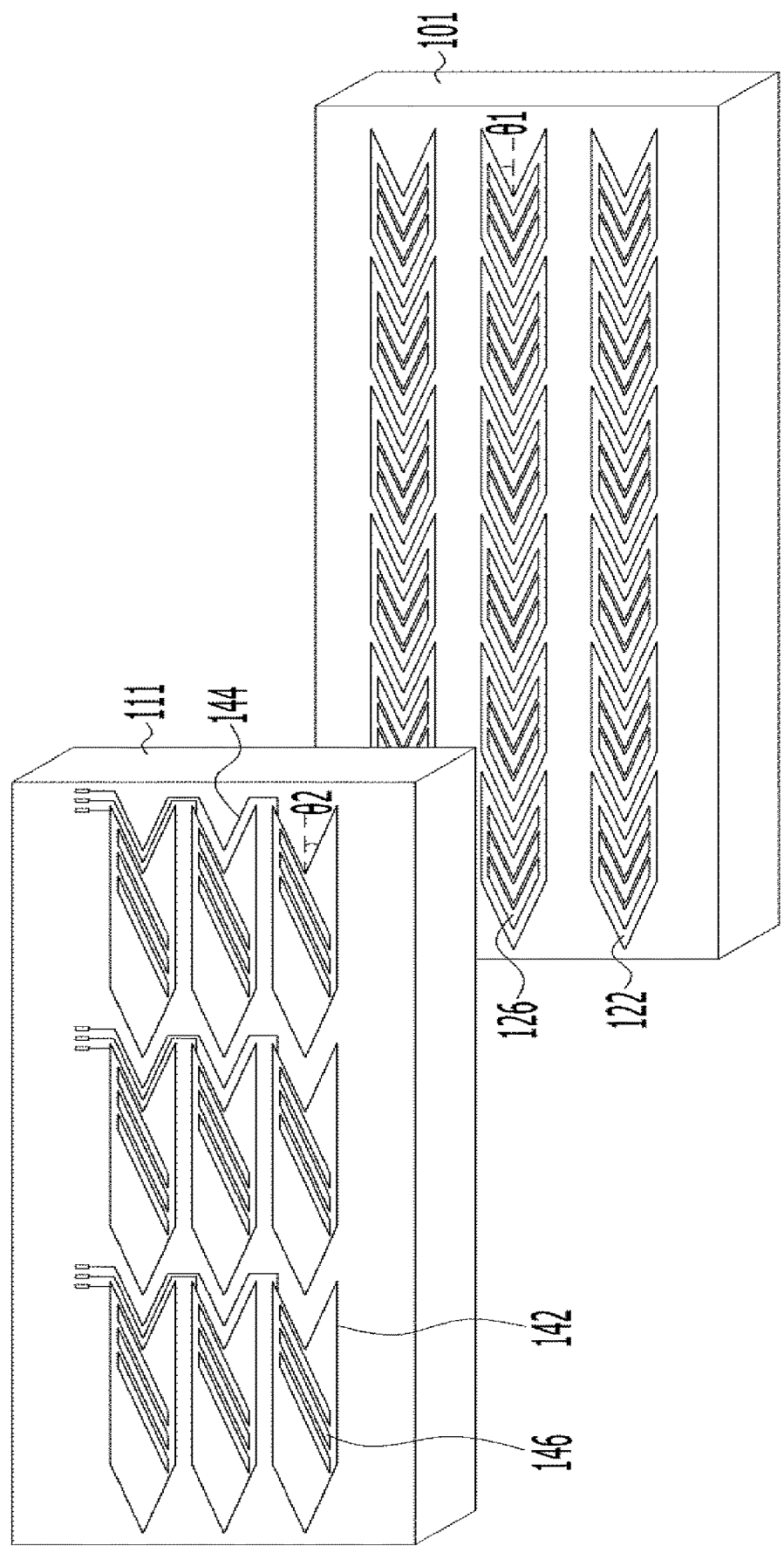
FIG. 5 is a schematic view illustrating a second embodiment related to the arrangement relationship between the touch-sensing electrodes and the display electrodes illustrated in FIG. 2.

As illustrated in FIGS. 4 and 5, the touch sensor 140 includes a plurality of touch-sensing electrodes 142 and touch sensing lines 144 connected to the touch-sensing electrodes 142.

The touch sensing lines 144 are connected to the touch-sensing electrodes 142 and transmit a user touch signal, sensed by the touch-sensing electrodes 142, to a touch driver (not illustrated). At this time, the touch sensing lines 144 are connected to the touch-sensing electrodes 142 in a one-to-one ratio.

The touch-sensing electrodes 142 are formed of a transparent conductive film on the back surface of the upper substrate 111. At this time, the touch-sensing electrodes 142 are formed via a single mask process using the same material as the touch sensing lines 144, which may simplify the process.

The touch-sensing electrodes 142 are spaced apart from one another by a predetermined distance on the back surface of the upper substrate 111 so as to sense a user touch position. Each of the touch-sensing electrodes 142 has a size corresponding to each of the pixel areas formed on the lower substrate 101 in consideration of a user touch area. Accordingly, each touch-sensing electrode 142 has the same shape as the pixel electrode 122 and is greater in size than the pixel electrode 122 by n times (here, n being a positive integer greater than 1).

The touch-sensing electrode 142 has a plurality of touch slits 146 in consideration of resistance and transmittance. At this time, the touch slits 126 are parallel to the display slits 126 formed in at least one display electrode among the pixel electrode 122 and the common electrode 124. The side surface of the touch-sensing electrode 142, exposed by the touch slits 146, is inclined at a second angle θ2 within the range from zero to 10 degrees relative to the gate line GL.

Accordingly, by matching the structure of the touch-sensing electrode 142 with the structure of the display electrode, the folding direction and angle θ1 of the pixel electrode 122, which is the display electrode, and the folding direction and angle θ2 of the touch-sensing electrode 142 become the same. For example, the folding angles θ1 and θ2 of the pixel electrode 122 and the touch-sensing electrode 142 range from zero to 10 degrees relative to the gate line GL.

Specifically, as illustrated in FIG. 4, when the pixel electrode 122, which is the display electrode, includes the display slits 126, which are folded in first and second directions by an angle of 0 to 10 degrees relative to any one of the gate line GL and the data line DL, the touch-sensing electrode 142 also has the touch slits 146, which are folded in first and second directions by an angle of 0 to 10 degrees relative to the gate line GL. That is, the pixel electrode 122 has the display slits 126 in the shape of "<" or ">", which is symmetrical about the center line of each pixel area, which is parallel to the gate line GL, and the touch-sensing electrode 142 has the touch slits 146 in the shape of "<" or ">", which is inclined in the same direction as the display slits 126.

In this case, the folding angle θ1 of the pixel electrode 122 and the folding angle θ2 of the touch-sensing electrode 142, which determine the direction of diffracted images, become the same, such that an image diffracted by each touch-sensing electrode 142 and an image diffracted by each pixel electrode 122 are generated in the same direction. Thereby, matrix scattering caused by images diffracted by the pixel electrodes 122 and matrix scattering caused by images diffracted by the touch-sensing electrodes 142 appear in the same two directions so as to coincide with each other.

In addition, as illustrated in FIG. 5, when the pixel electrode 122, which is the display electrode, includes the display slits 126, which are folded in first and second directions by an angle of 0 to 10 degrees relative to any one of the gate line GL and the data line DL, the touch-sensing electrode 142 has the touch slits 146, which are folded in any one of the first and second directions by an angle of 0 to 10 degrees relative to the gate line GL. That is, the pixel electrode 122 has the display slits 126 in the shape of "<" or ">", which is symmetrical about the center line of each pixel area, which is parallel to the gate line GL, and the touch-sensing electrode 142 has the touch slits 146 in the shape of "/" or "\", which is inclined in the same direction as any one of the two inclination directions of the display slits 126.

In this case, the folding angle of the touch-sensing electrode 142, which determines the direction of a diffracted image, becomes the same as the folding angle of the pixel electrode 122, whereby an image diffracted by the touch-sensing electrode 142 and an image diffracted by the pixel electrode 122 are generated in the same direction. Thereby, matrix scattering caused by images diffracted by the pixel electrodes 122 appears in two directions, and matrix scattering caused by images diffracted by the touch-sensing electrodes 142 appears in any one direction among the two directions so as to coincide with the matrix scattering caused by the display electrodes in the corresponding direction.

Figure 6:
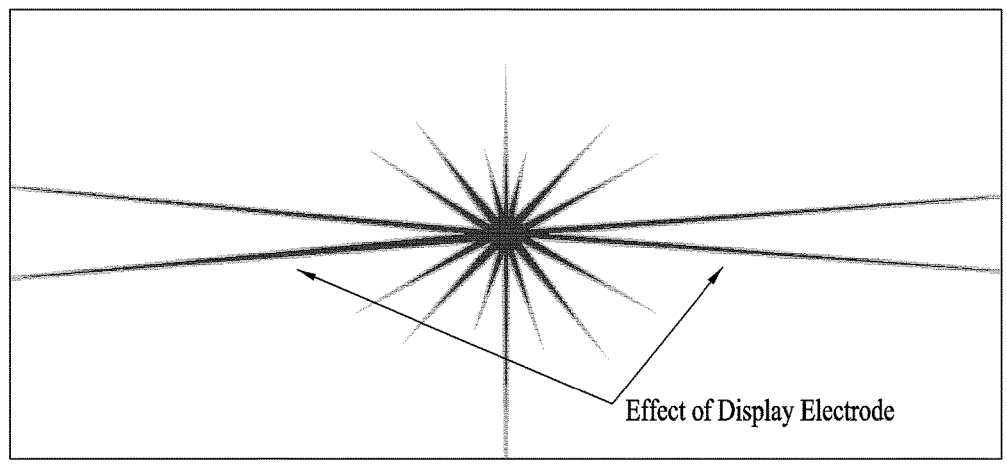
FIG. 6 is a schematic view explaining the improvement in resolution by the touch-sensing electrodes and the display electrodes according to the present invention.

In this way, in the present invention, because the matrix scattering caused by the touch-sensing electrodes 142 is offset by the matrix scattering caused by the pixel electrodes 122, as illustrated in FIG. 6, only the matrix scattering caused by the pixel electrodes 122, which are display electrodes, appears. Accordingly, it can be seen that visual deteriorations (e.g. double images and color-shift) attributable to the reflection of ambient light do not occur, which may prevent deterioration in image visibility.

Figure 7:
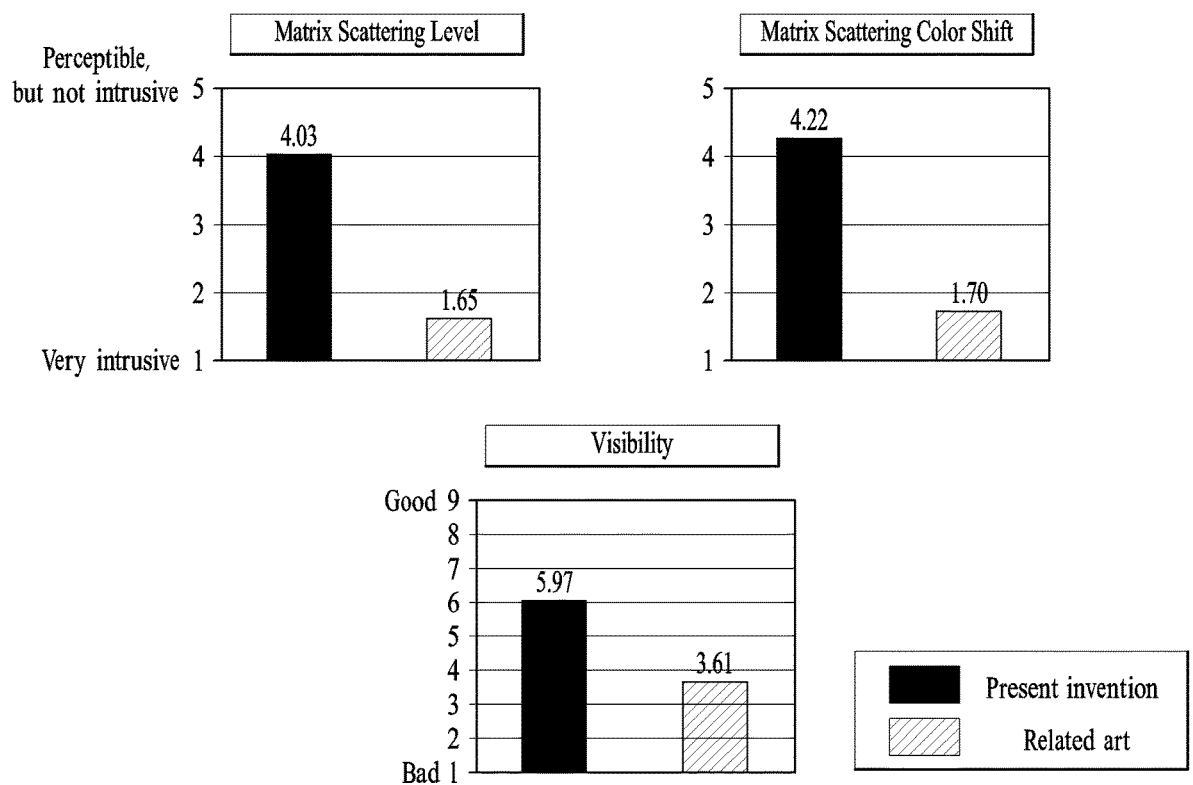
FIG. 7 includes graphical representation of comparative data illustrating the level of resolution of the touch display device according to the present invention in comparison with the related art.

In particular, as illustrated in FIG. 7, it can be seen that the present invention may improve matrix scattering and color-shift attributable to the matrix scattering and achieve improved image visibility, compared to the related art.

As is apparent from the above description, according to the present invention, a display electrode, which is at least one of a pixel electrode and a common electrode, and a touch-sensing electrode have the same folding structure such that they are formed at the same angle in the same direction. Accordingly, in the present invention, matrix scattering caused by the touch-sensing electrode is offset by matrix scattering caused by the display electrode, whereby only the matrix scattering caused by the display electrode appears. Therefore, it is possible to prevent deterioration in image visibility due to visual deteriorations (e.g. double images and color-shift) attributable to the reflection of ambient light.

The above description is merely given to describe the present invention by way of example, and numerous modifications and embodiments can be devised by those skilled in the art that will fall within the spirit and scope of the principles of this disclosure. Accordingly, the embodiments disclosed in the specification of the present invention are not intended to limit the present invention. The scope of the present invention should be construed by the following claims, and all technologies and the invention is to cover all modifications, equivalents, and alternatives falling within the spirit and scope of the invention as defined by the claims.

What is claimed is:

1. A touch display device comprising:
a display panel including a pixel electrode located in each of a plurality of pixel areas;
a gate line and a data line crossing each other in each of the plurality of pixel areas; and
a touch-sensing electrode located on top of the display panel for sensing whether a user touch occurs,
wherein the pixel electrode and the touch-sensing electrode are inclined at a same angle, which is lower than 10 degrees relative to the gate line in a same direction,
wherein the touch-sensing electrode has a plurality of inclined touch slits in a shape of "/" or "\" and the plurality of touch slits are all inclined in a same direction,
wherein the pixel electrode has a plurality of display slits in a shape "<" or ">," and the plurality of touch slits are arranged in parallel to any one of two inclination directions of each of the plurality of display slits, and
wherein the pixel electrode is exposed through a contact hole and formed on a protective film covering a common electrode located in the plurality of pixel areas for generating an electric field together with the pixel electrode.

2. The touch display device according to claim 1, wherein the pixel electrode has a side surface exposed by the plurality of display slits, and the exposed side surface is inclined at an angle lower than 10 degrees relative to the gate line, and
wherein the touch-sensing electrode has a side surface exposed by the plurality of touch slits, and the exposed side surface is inclined at an angle lower than 10 degrees relative to the gate line.

* * * * *